(12) United States Patent
Tongue

(10) Patent No.: US 7,601,208 B2
(45) Date of Patent: Oct. 13, 2009

(54) WATER-FROM-AIR USING LIQUID DESICCANT AND VEHICLE EXHAUST

(75) Inventor: Stephen Tongue, Hampden, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 667 days.

(21) Appl. No.: 11/267,978

(22) Filed: Nov. 7, 2005

(65) Prior Publication Data

US 2007/0101862 A1    May 10, 2007

(51) Int. Cl.
*B01D 53/14*    (2006.01)
(52) U.S. Cl. ............... 96/266; 95/229; 95/231; 96/270; 96/271; 96/322; 96/242

(58) Field of Classification Search ............ 95/117–123, 95/126; 96/121, 130, 126–128, 146, 143–144; 55/208, 213
See application file for complete search history.

(56) References Cited

U.S. PATENT DOCUMENTS

| 4,178,158 | A | * | 12/1979 | Yoshida et al. ................ 96/242 |
| 4,180,985 | A | * | 1/1980 | Northrup, Jr. ................... 62/94 |
| 6,156,102 | A | * | 12/2000 | Conrad et al. ................. 95/172 |
| 6,863,711 | B2 | * | 3/2005 | Tongue et al. .................. 95/10 |
| 7,043,934 | B2 | * | 5/2006 | Radermacher et al. ......... 62/285 |
| 7,306,654 | B2 | * | 12/2007 | King et al. ..................... 95/224 |

* cited by examiner

*Primary Examiner*—Duane Smith
*Assistant Examiner*—Ives Wu
(74) *Attorney, Agent, or Firm*—Carlson, Gaskey & Olds

(57) ABSTRACT

A water production unit is provided that uses liquid desiccant and vehicle exhaust for extracting water from air.

9 Claims, 2 Drawing Sheets

WATER-FROM-AIR USING LIQUID DESICCANT AND VEHICLE EXHAUST

BACKGROUND OF THE INVENTION

This invention relates to a water production unit that operates to efficiently extract water from air using heat from exhaust.

One by-product of combustion from an engine is heat. Heat is typically rejected from the engine as a waste product, in the form of a hot exhaust stream. However, this heat may be used to drive a process for recovering water from the ambient air. There are many environments in which an engine is used where water is desired but not readily available. For example, during military campaigns water is typically brought to remote or arid regions where water is not readily available. Water must be brought along a supply line to troops, where military vehicles are often present, which is dangerous and costly.

A water recovery system has been proposed to extract water from the ambient air using heat from a turbine or internal combustion exhaust. The proposed system is suggested for a stationary turbine engine used in a power generation plant to reduce emissions by injecting the recovered water into the combustor, or for mobile engine applications where a supply of potable water is desired. However, any system employed in a military or similar vehicle must be highly efficient to justify the system. Therefore, what is needed is an improved water production unit for an engine.

SUMMARY OF THE INVENTION

This invention relates to a water production unit that produces water from air using a liquid desiccant and heat from a vehicle exhaust. The unit includes a liquid loop having a liquid desiccant. The liquid loop is adapted to be exposed to a process air for adsorbing moisture with the liquid desiccant. The unit includes an exhaust source producing heat, such as an engine from a mobile vehicle. A heat exchanger is in fluid communication with the exhaust source. The heat exchanger is arranged to provide the heat to the liquid loop for desorbing moisture from the liquid desiccant. A storage container is in fluid communication with the liquid loop for collecting the separated water.

A method of producing water using the unit includes exposing a liquid desiccant to air. The liquid desiccant is collected and heated with an exhaust source. Water, desorbed from the liquid desiccant is stored.

Accordingly, the present invention provides a unit that efficiently extracts water from the air using a liquid desiccant and heat from the vehicles exhaust.

These and other features of the present invention can be best understood from the following specification and drawings, the following of which is a brief description.

DETAILED DESCRIPTION OF THE PREFERRED EMBODIMENT

Figure 1:
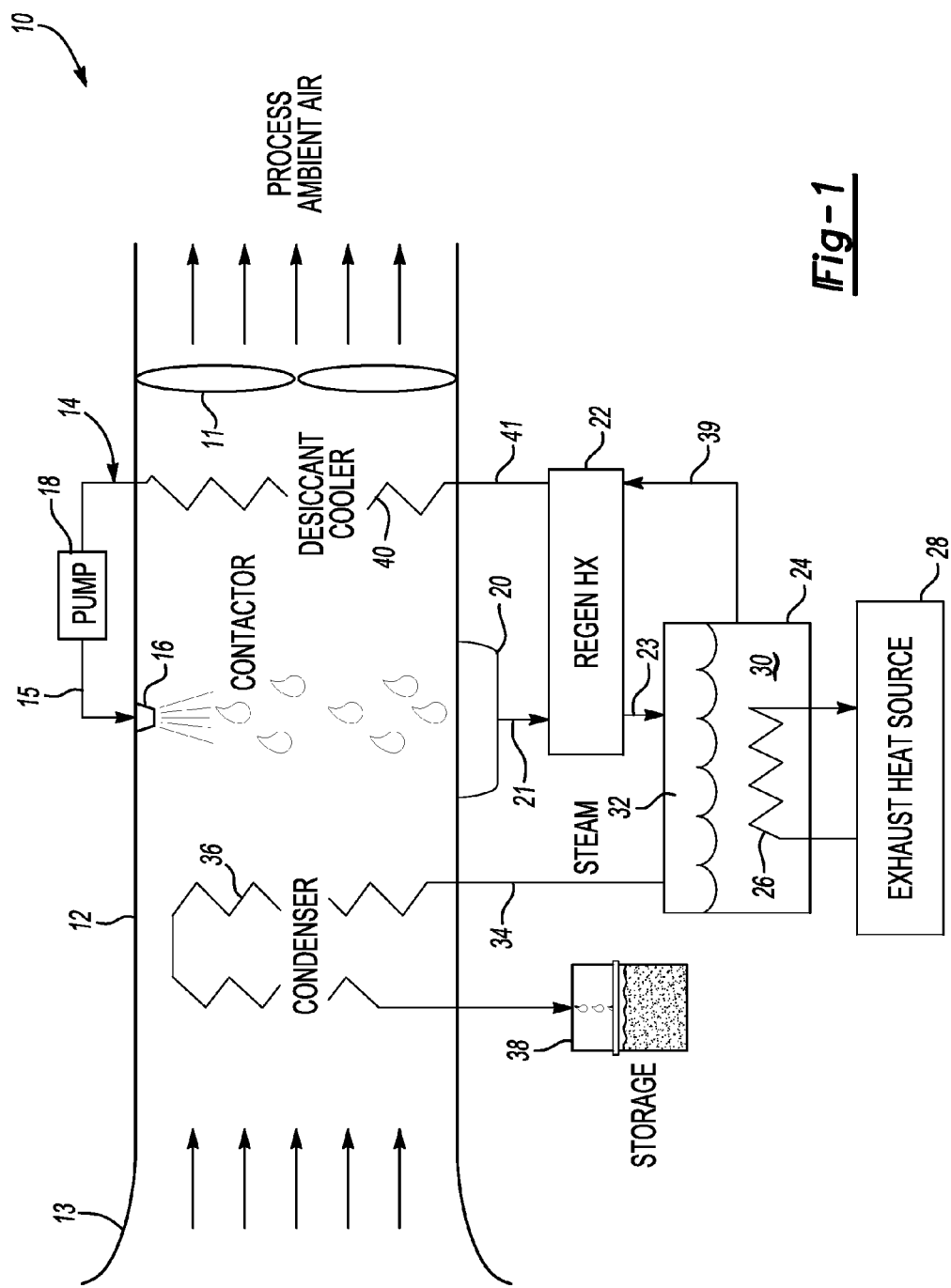
FIG. 1 is a highly schematic view of a water production unit in which water is extracted from air using liquid desiccant and heat from the vehicle's exhaust.

A water production unit 10 is schematically shown in FIG. 1. The unit 10 includes a duct 12 for directing an air stream of a process air, or ambient air, in a desired manner. A fan 11 is arranged in the duct 12 to draw air through the duct 12 if, for example, a mobile vehicle to which the unit 10 may be mounted is stationary. The duct 12 includes an inlet 13 for forcibly receiving air when the mobile vehicle is moving.

As mentioned above, the unit 10 may be integrated with a mobile vehicle, such as a military vehicle, having an exhaust source 28, which may be provided by a combustion engine of the vehicle. However, one of ordinary skill will appreciate that the unit 10 may have other applications.

Unit 10 includes a liquid loop 14 having a liquid desiccant of a suitable composition. The liquid desiccant is circulated with a pump 18 from a first passage 15 through a contactor 16 or nozzle into the duct 12 to expose the liquid desiccant to the process air to adsorb moisture from the air. A collector 20 is arranged in a desired manner to collect the moisture-laden desiccant. The liquid desiccant flows from the collector 20 through a second passage 21 to a regeneration heat exchanger 22 where the moisture-laden liquid desiccant begins to desorb the moisture. The liquid desiccant gathers in a tank 24, which includes a heat exchanger 26. The heat exchanger 26 is in fluid communication with the exhaust source 28 to heat the liquid desiccant within the tank 24. The heated liquid desiccant fluid desorbs water and the water turns to steam 32. The steam flows through pipe 34 into a condenser 36, which may be arranged in the duct 12. The condenser 36 condensates the steam 32 and provides the condensate to a storage container 38.

The desorbed liquid desiccant flows from the tank 24 through a fourth passage 39 into the regeneration heat exchanger 22 where the liquid desiccant is cooled in preparation for again adsorbing moisture from the duct air stream. The liquid desiccant flows from the regeneration heat exchanger 22 through a fifth passage 41 into a cooler 40, which is arranged in the duct 12. The liquid desiccant is cooled by the cooler 40 to increase the liquid desiccant's capacity to adsorb water prior to being pumped back into the duct 12.

Figure 2:
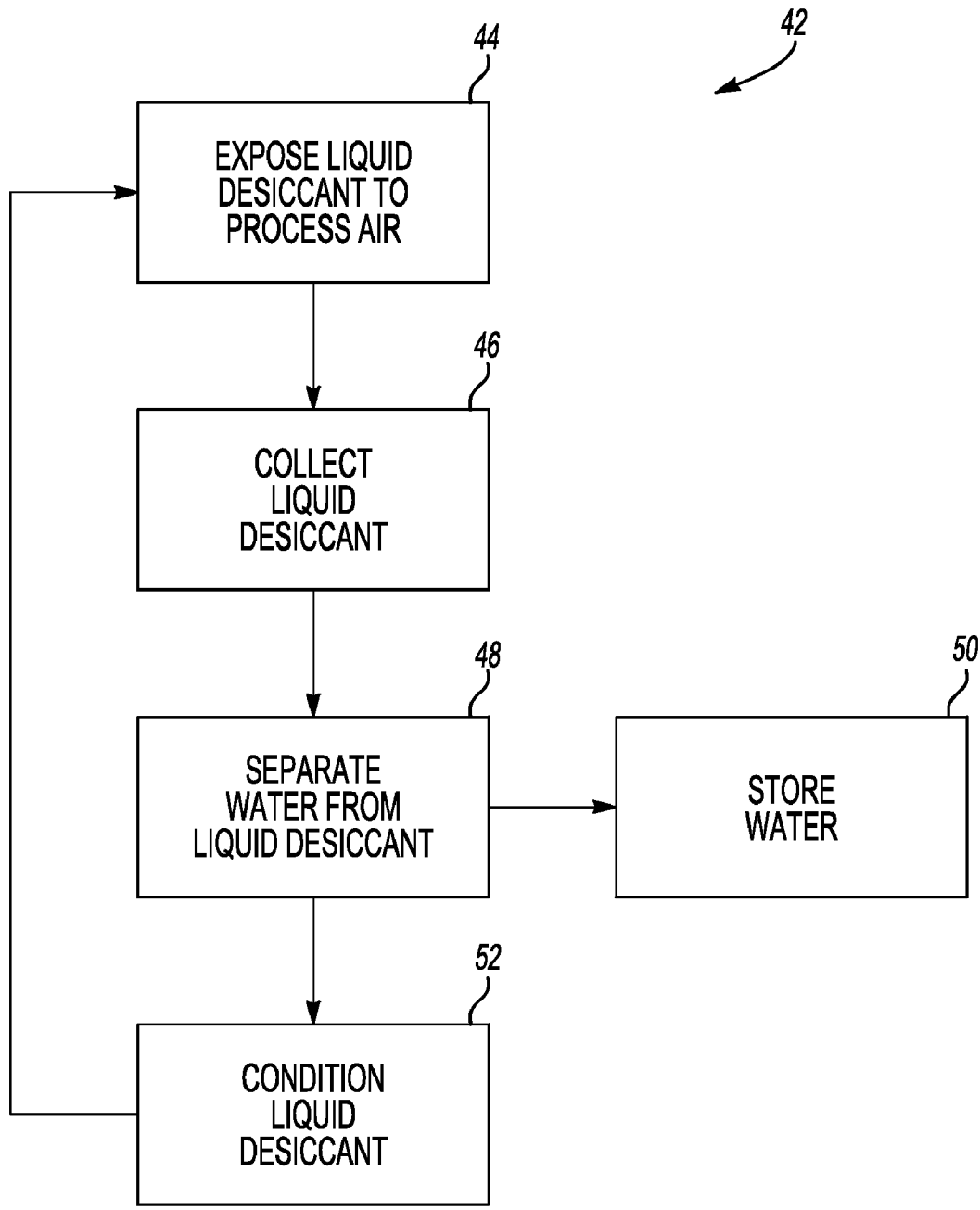
FIG. 2 is a block diagram of a method of using the inventive water production unit.

A method 42 of using the unit 10 is shown schematically by a block diagram in FIG. 2. The method 42 includes exposing the liquid desiccant to the process air, as indicated at block 44. The liquid desiccant is disbursed using the contactor 16 in the duct air stream, shown in FIG. 1. The liquid desiccant is collected, as indicated at block 46. The water is separated from the liquid desiccant, as indicated at block 48, by using heat from the exhaust source 28. The separated water is stored, as indicated at block 50. The liquid desiccant is conditioned, as indicated at block 52, for recirculation to the contactor 16 for again adsorbing moisture from the air stream.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A water production unit comprising:
   a liquid loop having a liquid desiccant, the liquid loop adapted to be exposed to a process air for adsorbing moisture with the liquid desiccant;
   an exhaust source producing heat;
   a heat exchanger in fluid communication with the exhaust source, the heat exchanger arranged to provide the heat to the liquid loop for desorbing moisture from the liquid desiccant and producing steam;
   a storage container in fluid communication with the liquid loop for collecting the moisture; and wherein the liquid loop intersects a duct carrying the process air, the liquid loop exposing the liquid desiccant to the process air, a condenser arranged in the duct configured to receive the steam and produce condensate, the condensate returned to the storage container.

2. The water production unit according to claim 1, wherein the liquid loop includes a tank fluidly connected to the storage container.

3. The water production unit according to claim 2, wherein the heat exchanger is in fluid communication with the tank.

4. The water production unit according to claim 3, wherein the condenser is arranged between and in fluid communication with the storage container and the tank, the condenser receiving the steam from the tank and producing the condensate collected by the storage container.

5. The water production unit according to claim 1, wherein the liquid loop includes a contactor dispersing the liquid desiccant in the process air to adsorb moisture, and a collector gathering moisture-laden liquid desiccant into the liquid loop.

6. The water production unit according to claim 5, wherein the liquid loop includes a desiccant cooler arranged in the process air upstream of the contactor.

7. The water production unit according to claim 5, wherein a regeneration heat exchanger is in fluid communication with the liquid loop, the regeneration heat exchanger assisting the heat exchanger in desorbing moisture from the liquid desiccant.

8. The water production unit according to claim 1, wherein a fan is arranged within the duct for moving the process air through the duct.

9. The water production unit according to claim 1, wherein the exhaust source is a combustion engine of a mobile vehicle.

* * * * *

UNITED STATES PATENT AND TRADEMARK OFFICE
CERTIFICATE OF CORRECTION

PATENT NO. : 7,601,208 B2
APPLICATION NO. : 11/267978
DATED : October 13, 2009
INVENTOR(S) : Tongue Page 1 of 1

It is certified that error appears in the above-identified patent and that said Letters Patent is hereby corrected as shown below:

IN THE CLAIMS:

Claim 1, column 3, line 3: insert --and-- after "air,"

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

PATENT NO.        : 7,601,208 B2
APPLICATION NO. : 11/267978
DATED             : October 13, 2009
INVENTOR(S)       : Stephen Tongue It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Fifth Day of October, 2010

David J. Kappos
*Director of the United States Patent and Trademark Office*